(12) United States Patent
Telukunta et al.

(10) Patent No.: US 11,787,484 B2
(45) Date of Patent: Oct. 17, 2023

(54) STRUCTURAL ASSEMBLY FOR VEHICLE COMPONENTS HAVING CONTINUOUSLY FORMED COMPOSITE REINFORCEMENT

(71) Applicant: Ford Global Technologies, LLC, Dearborn, MI (US)

(72) Inventors: Rohit Telukunta, Novi, MI (US); Steven Frank, Dearborn, MI (US); Leonard Anthony Shaner, New Baltimore, MI (US); Dragan B. Stojkovic, Taylor, MI (US); Sankarsh Kanth Aekbote Vishnukanth, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/544,163

(22) Filed: Dec. 7, 2021

(65) Prior Publication Data

US 2023/0174165 A1 Jun. 8, 2023

(51) Int. Cl.
| | |
|---|---|
| *B62D 25/04* | (2006.01) |
| *B62D 25/02* | (2006.01) |
| *B62D 25/06* | (2006.01) |
| *B62D 29/00* | (2006.01) |
| *B62D 21/02* | (2006.01) |
| *B62D 65/02* | (2006.01) |
| *B62D 27/02* | (2006.01) |

(52) U.S. Cl.
CPC .......... *B62D 29/001* (2013.01); *B62D 21/02* (2013.01); *B62D 25/04* (2013.01); *B62D 27/023* (2013.01); *B62D 65/024* (2013.01)

(58) Field of Classification Search
CPC ...... B62D 25/04; B62D 25/06; B62D 29/001; B62D 29/005; B62D 65/024; B62D 27/02
USPC .......... 296/29, 30, 209, 203.03, 210, 193.06
See application file for complete search history.

(56) References Cited

U.S. PATENT DOCUMENTS

| | | | |
|---|---|---|---|
| 9,682,674 B2 | 6/2017 | Corwin et al. | |
| 9,834,252 B2 | 12/2017 | Schnaufer et al. | |
| 10,112,463 B2 * | 10/2018 | Deng | B60J 5/0437 |
| 10,160,499 B2 | 12/2018 | Cooper et al. | |
| 10,570,258 B2 | 2/2020 | Richardson et al. | |
| 10,718,086 B2 | 7/2020 | Braymand et al. | |
| 10,940,896 B2 | 3/2021 | Richardson | |
| 10,946,627 B2 | 3/2021 | Richards et al. | |
| 11,091,012 B2 * | 8/2021 | Williams | B60J 5/0425 |
| 11,110,670 B2 | 9/2021 | Richardson et al. | |
| 2017/0050412 A1 | 2/2017 | Vanlerberghe et al. | |
| 2018/0036970 A1 | 2/2018 | Chmielewski et al. | |
| 2019/0077095 A1 | 3/2019 | Richardson et al. | |
| 2020/0156711 A1 | 5/2020 | Workinger et al. | |

(Continued)

FOREIGN PATENT DOCUMENTS

| | | | | |
|---|---|---|---|---|
| CN | 110116759 | * | 8/2019 | .......... B62D 25/145 |
| WO | WO-2015011422 A1 | * | 1/2015 | ............ B62D 25/04 |

*Primary Examiner* — Dennis H Pedder
(74) *Attorney, Agent, or Firm* — Burris Law, PLLC (57) ABSTRACT

A hybrid structural assembly includes a vehicle structural member extending from a first end to a second end, and a composite reinforcement member attached to the vehicle structural member between the first and second ends of the vehicle structural member. The composite reinforcement member being formed by a continuous method and cut to a predetermined length extending from the first end to the second end.

17 Claims, 10 Drawing Sheets

(56) References Cited

U.S. PATENT DOCUMENTS

| | | |
|---|---|---|
| 2020/0157293 A1 | 5/2020 | Chmielewski |
| 2020/0164602 A1 | 5/2020 | Hursit et al. |
| 2021/0053625 A1 | 2/2021 | Richardson |
| 2021/0237377 A1 | 8/2021 | Richardson |

* cited by examiner

STRUCTURAL ASSEMBLY FOR VEHICLE COMPONENTS HAVING CONTINUOUSLY FORMED COMPOSITE REINFORCEMENT

FIELD

The present disclosure relates to motor vehicle structures, and more particularly to composite energy-absorbing motor vehicle structures constructed with composite materials.

BACKGROUND

The statements in this section merely provide background information related to the present disclosure and not constitute prior art.

Motor vehicles generally include requirements for structural members to absorb impact loads. For example, in a Federal Motor Vehicle Safety Standard (FMVSS) 214 test, a vehicle structural member is tested for energy absorption during a side impact. The shape and/or material of the structural members and reinforcements to meet these requirements affect total vehicle weight and manufacturing cost.

With the future being a mix of electric vehicles (EVs), hybrid vehicles (HEV, PHEV) and internal combustion engines (ICEs), challenges exist to design body-in-white (BIW) without significant changes to the body structure while maintaining equal or better performance across each type of vehicle. Further, the long term durability of the vehicle/structure should be maintained across variants that may tend to increase vehicle weight, while the vehicle program may not want to deviate significantly from its vehicle architecture.

The present disclosure addresses the challenges of designing a vehicle structure considering desired characteristics for energy absorption, weight, and cost of the vehicle across multiple vehicle platforms.

SUMMARY

A hybrid structural assembly includes a vehicle structural member extending from a first end to a second end and a composite reinforcement member attached to the vehicle structural member between the first and second ends of the vehicle structural member, the composite reinforcement member being formed by a continuous method and cut to a predetermined length extending from the first end to the second end.

In variations of this hybrid structural assembly, which may be implemented individually or in any combination: the composite reinforcement member has a uniform cross-section from a first longitudinal end to a second longitudinal end; the cross-section of the composite reinforcement member defines a closed shape; the cross-section of the composite reinforcement member defines an open shape; the composite reinforcement member includes a plurality of fibers; the vehicle structural member extends continuously between the first end and the second end, and the at least one of the plurality of fibers extends along the vehicle structural member between the first end and the second end, the plurality of fibers extends continuously from a first longitudinal end of the composite reinforcement member to a second longitudinal end of the composite reinforcement member; the fibers are unidirectional; a first longitudinal end of the composite reinforcement member and a second longitudinal end of the composite reinforcement member are disposed between the first end of the vehicle structural member and the second end of the vehicle structural member; the continuous method is pultrusion; the continuous method includes pultruding an adhesive layer that is an outermost layer of the composite reinforcement member; the assembly further includes a fitting connecting a first longitudinal end of the composite reinforcement member to an adjacent vehicle structural member; the assembly further includes a second fitting connecting a second longitudinal end of the composite reinforcement member to the adjacent vehicle structural member; the vehicle structural member includes an inner member and an outer member outboard of the inner member, and the composite reinforcement member is disposed between the inner member and the outer member; and the vehicle structural member is one of a vehicle pillar, a rocker panel, or a body cross-member.

In another form, a vehicle body is provided that includes vehicle structural member including a first end and a second end, a composite reinforcement member attached to the vehicle structural member, the composite reinforcement member including a first longitudinal end, a second longitudinal end, and a plurality of pultruded layers extending continuously from the first longitudinal end to the second longitudinal end, and a fitting connecting the first longitudinal end of the composite reinforcement member to an adjacent vehicle structural member. The composite reinforcement member has a uniform cross-section from the first longitudinal end to the second longitudinal end.

In variations of this hybrid structural assembly, which may be implemented individually or in any combination: the first longitudinal end of the composite reinforcement member and the second longitudinal end of the composite reinforcement member are disposed between the first end of the vehicle structural member and the second end of the vehicle structural member; and the vehicle structural member is one of a vehicle pillar, a rocker panel, or a body cross-member.

In yet another form, a method of producing a hybrid structural assembly is provided that includes forming, by a continuous method, a composite reinforcement member, cutting the composite reinforcement member to a predetermined length extending from a first end of a vehicle structural member to a second end of a vehicle structural member, and attaching the composite reinforcement member to the vehicle structural member between the first and second ends of the vehicle structural member.

In a variation of this method, the method further includes forming the composite reinforcement member with a uniform cross-section from a first longitudinal end to a second longitudinal end.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
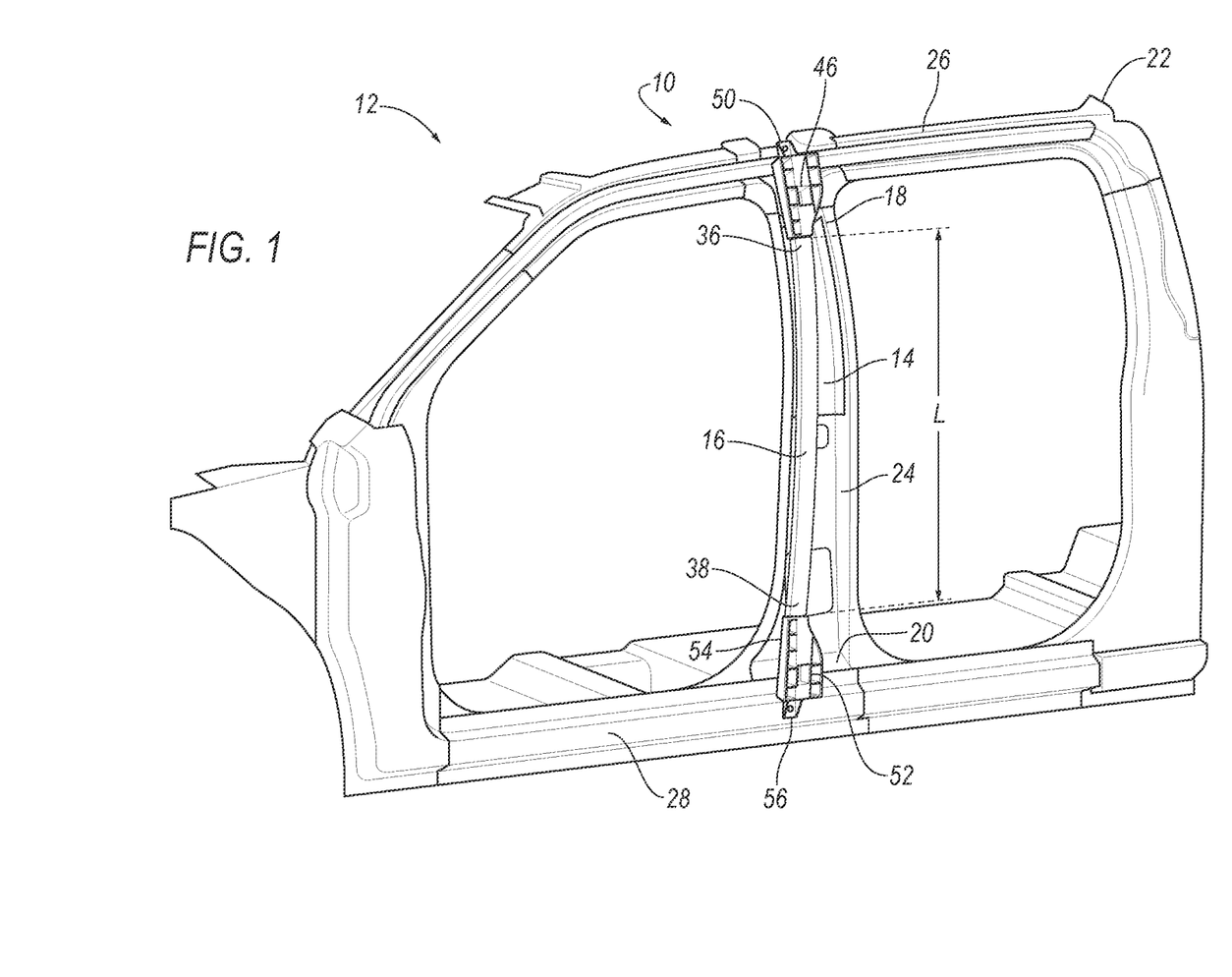
FIG. 1 is a perspective view of a vehicle door frame subassembly with a hybrid structural assembly according to the teachings of the present disclosure.

Referring to FIG. 1, a hybrid structural assembly 10 in a vehicle 12 includes a vehicle structural member 14 and a composite reinforcement member 16. The vehicle structural member 14 extends from a first end 18 to a second end 20. The composite reinforcement member 16 is attached to the vehicle structural member 14 between the first and second ends 18, 20 of the vehicle structural member 14. The composite reinforcement member 16 is formed by a continuous method and cut to a predetermined length L extending from the first end 18 to the second end 20.

As shown in FIGS. 1 and 5-8B, the vehicle 12 includes a body 22. The body 22 supports other parts of the vehicle 12, e.g., doors, windows, seats, etc. In one form, the vehicle 12 is a unibody construction or in another form is a body-on-frame construction. That is, in a unibody construction, the body 22 and a frame is formed as a substantially unitary construction and then attached to a subframe. Alternatively, not shown in the figures, in a body-on-frame construction, the body 22 and the frame is formed separately, and the body 22 and the frame then be joined in a suitable manner. These and other types of body constructions (e.g. full body castings) should be construed as falling within the scope of the present disclosure.

The body 22 includes a hybrid structural assembly 10, 10', 10'', 10''', also referred to herein as a "hybrid structural assembly 10". The hybrid structural assembly 10 includes a vehicle structural member 14. The vehicle structural member 14 provides support to other parts of the vehicle, such as by way of example, doors, windows, and floors, among others. The vehicle structural member 14 is, e.g., a vehicle pillar 24, 24' (collectively, "vehicle pillar 24") for the hybrid structural assembly 10, a roof rail 26 for the hybrid structural assembly 10', a rocker panel 28 for the hybrid structural assembly 10'', or a body cross-member 30 for the hybrid structural assembly 10'''. In other examples not shown in the figures, the vehicle structural member 14 is a header or a roof bow. It should be understood that these forms of the vehicle structural member 14 are exemplary and should not be construed as limiting the scope of the present disclosure.

Figure 4:
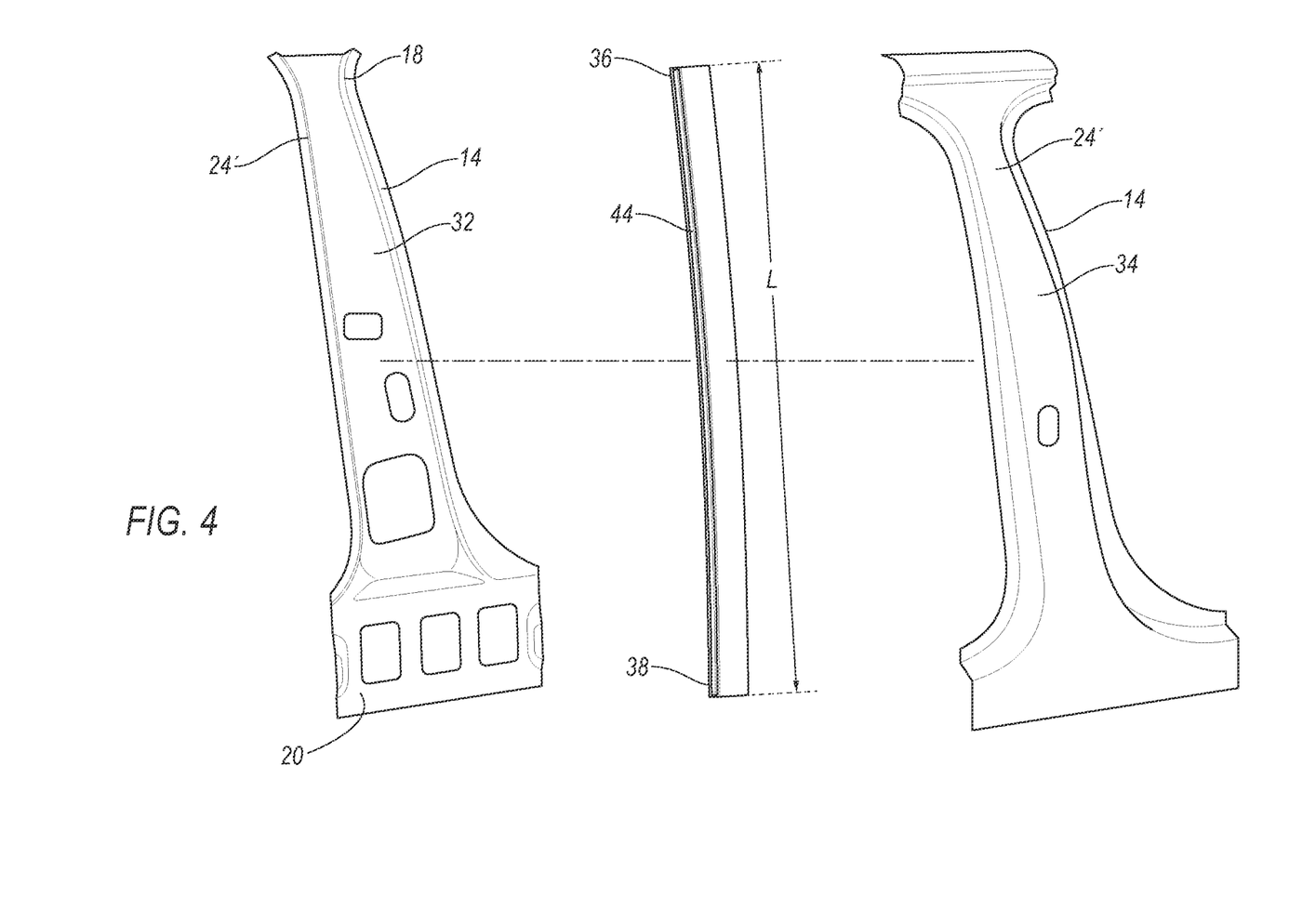
FIG. 4 is an exploded view of another vehicle structural member and another composite reinforcement member according to the teachings of the present disclosure.

Referring also to FIG. 4, the vehicle structural member 14 extends from the first end 18 to the second end 20. The vehicle structural member 14 is a suitable material, such as by way of example, steel, boron, or aluminum, among others. In one form, the vehicle structural member 14 includes an inner member 32 and an outer member 34, such as the vehicle pillar 24'. The outer member 34 is outboard of inner member 32, i.e., disposed toward an outer surface of the vehicle 12 relative to a center of the vehicle 12. During a vehicle impact, the vehicle structural member 14 is configured to absorb energy. Forming the vehicle structural member 14 as two separate members 32, 34 that are later joined provide specific energy absorption characteristics and/or manufacturing and weight benefits for the vehicle 12. Alternatively, the vehicle structural member 14 is a single piece.

Figure 2:
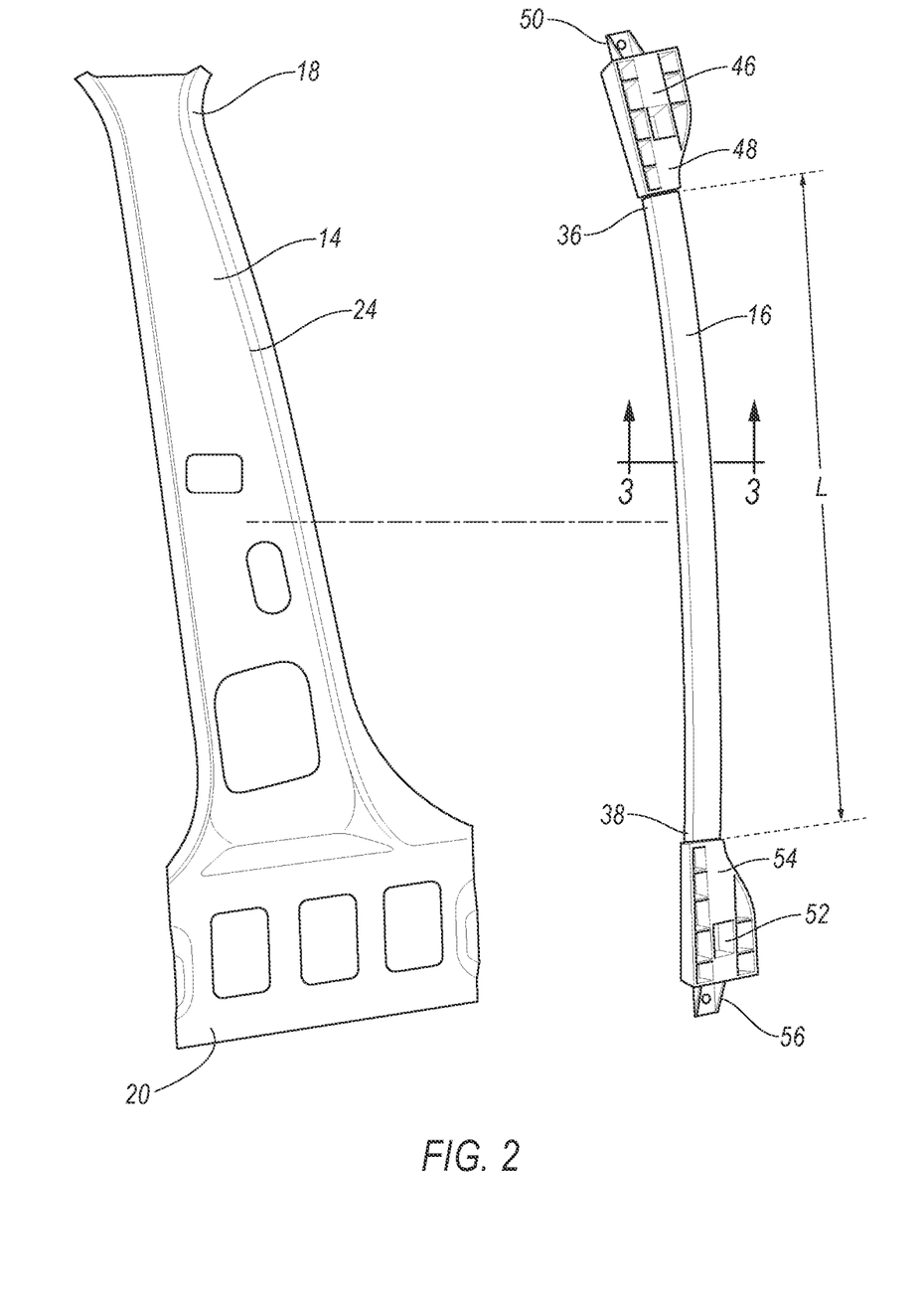
FIG. 2 is an exploded view of a vehicle structural member and a composite reinforcement member according to the teachings of the present disclosure.
Figure 5:
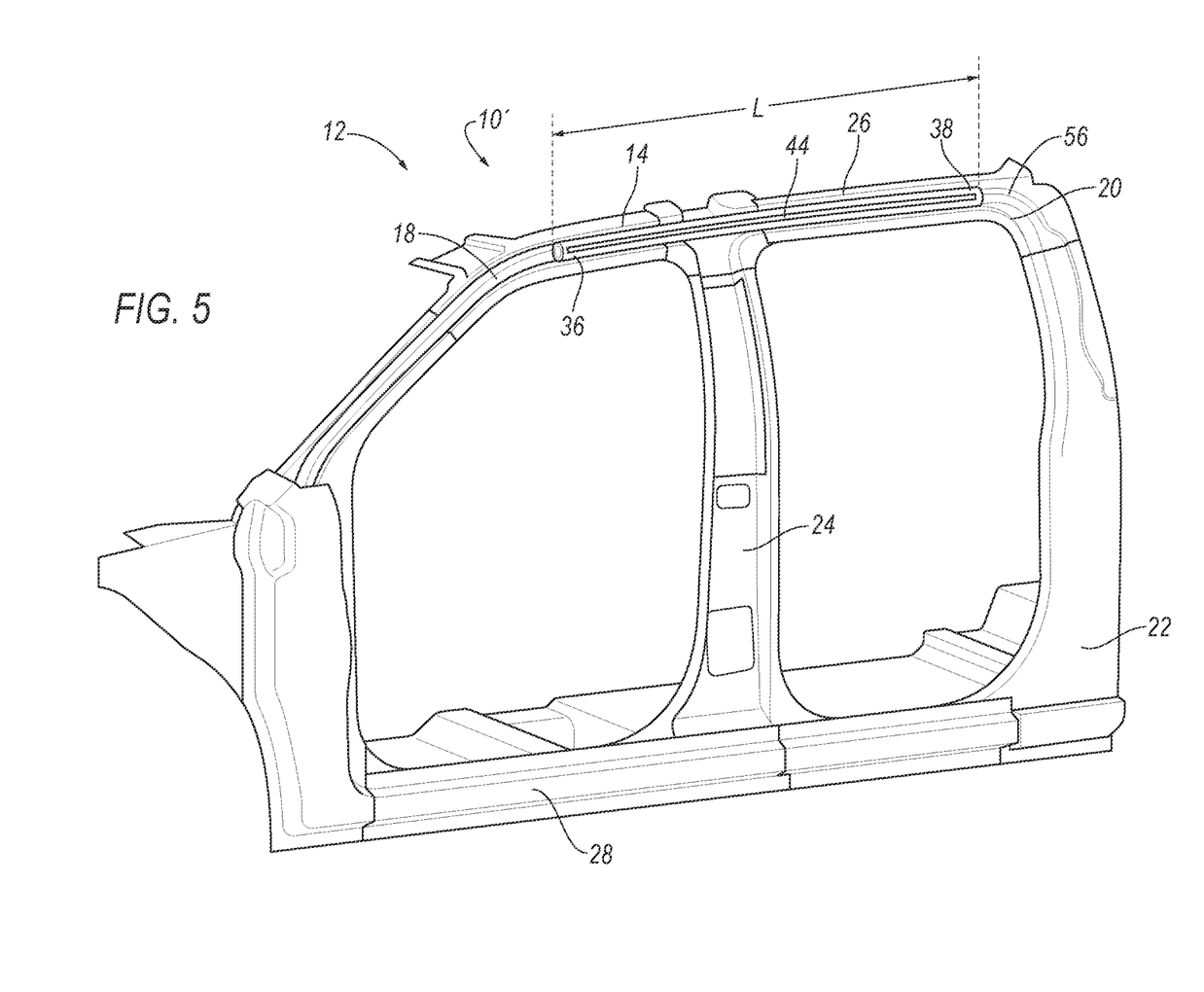
FIG. 5 is a perspective view of the composite reinforcement member attached to another vehicle structural member according to the teachings of the present disclosure.

As shown in FIG. 1, the hybrid vehicle assembly 10 includes the composite reinforcement member 16. The composite reinforcement member 16 is attached to the vehicle structural member 14 between the first and second ends 18, 20 of the vehicle structural member 14. During the vehicle impact, the composite reinforcement member 16 absorbs energy, reducing movement and deformation of the vehicle structural member 14. For example, as shown in FIGS. 1-2, and 4, the composite reinforcement member 16 of the hybrid structural assembly 10 absorbs energy from the vehicle pillar 24 during a side impact test. In another example, as shown in FIG. 5, the composite reinforcement member 16 of the hybrid structural assembly 10' absorbs energy from the roof rail 26 during a side or oblique impact test.

Figure 6:
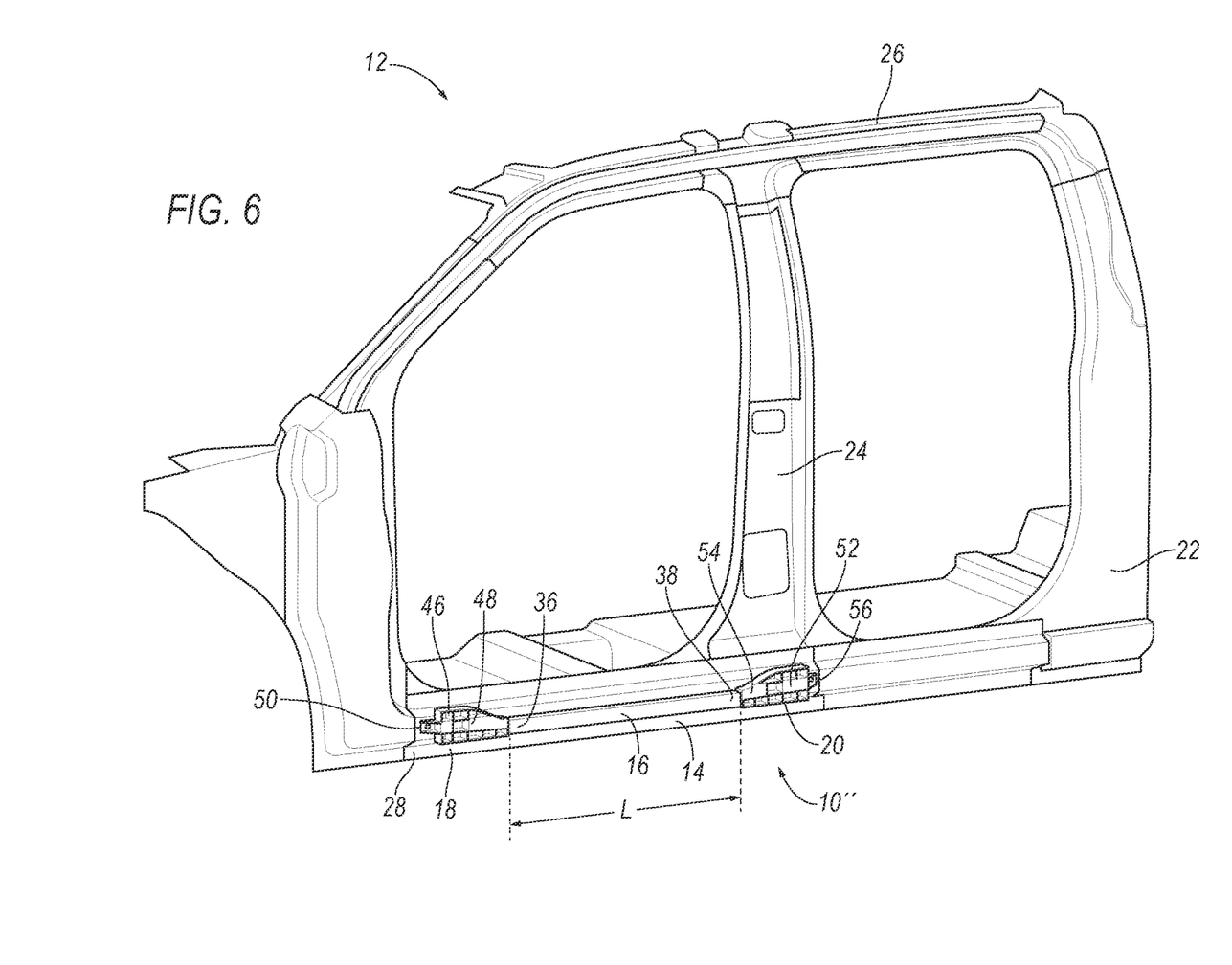
FIG. 6 is a perspective view of the composite reinforcement member attached to another vehicle structural member according to the teachings of the present disclosure.
Figure 7:
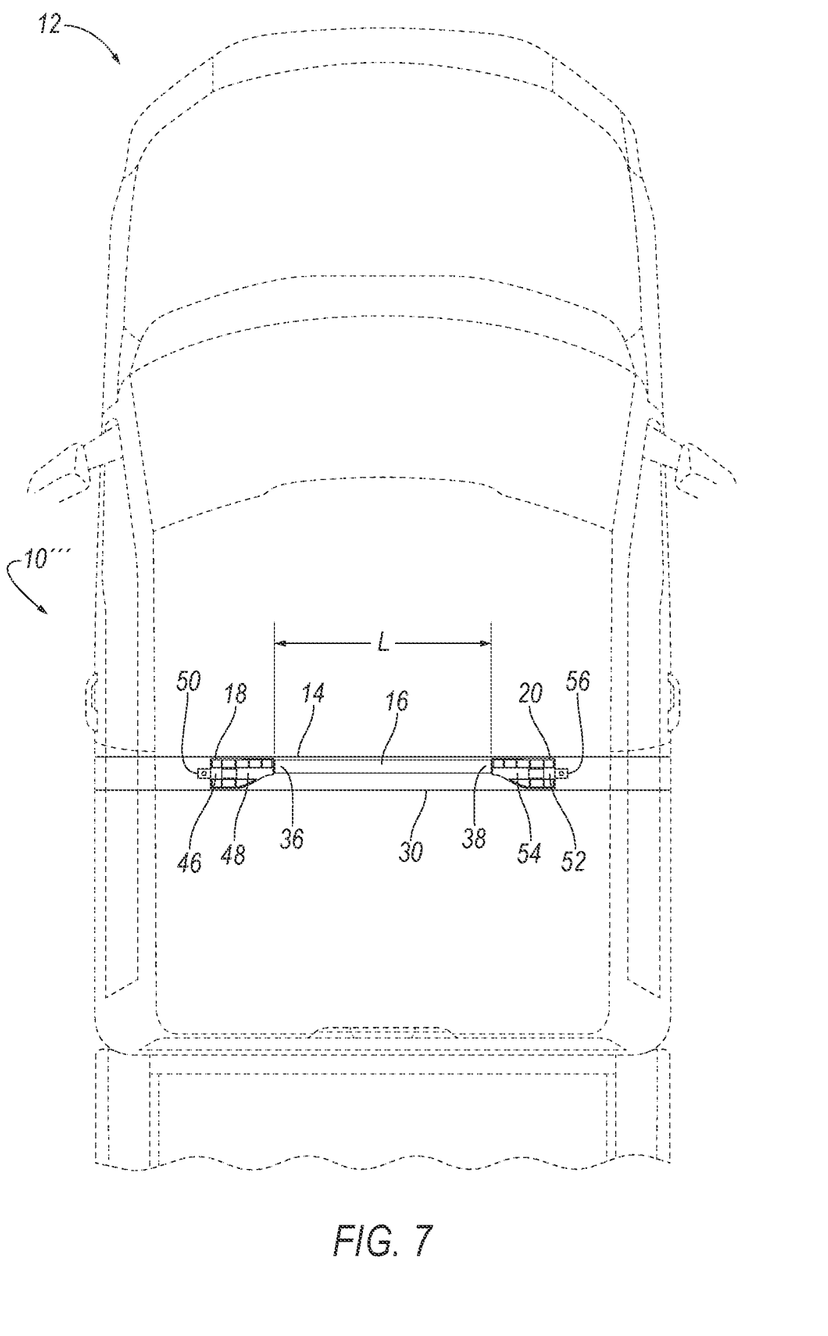
FIG. 7 is a plan view of a vehicle with the composite reinforcement member according to the teachings of the present disclosure.
Figure 8A:
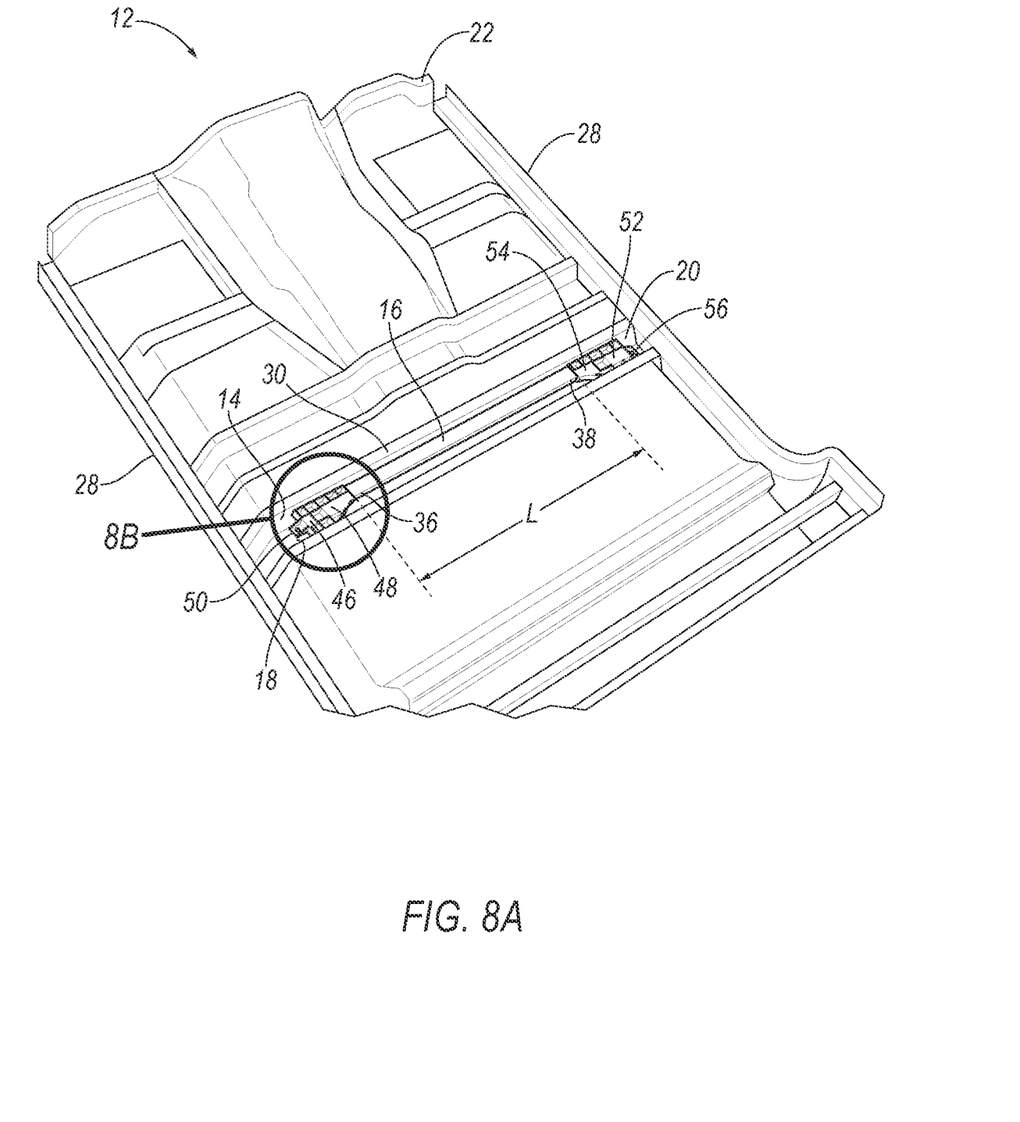
FIG. 8A is a perspective view of a vehicle cross-member with the composite reinforcement member according to the teachings of the present disclosure.
Figure 8B:
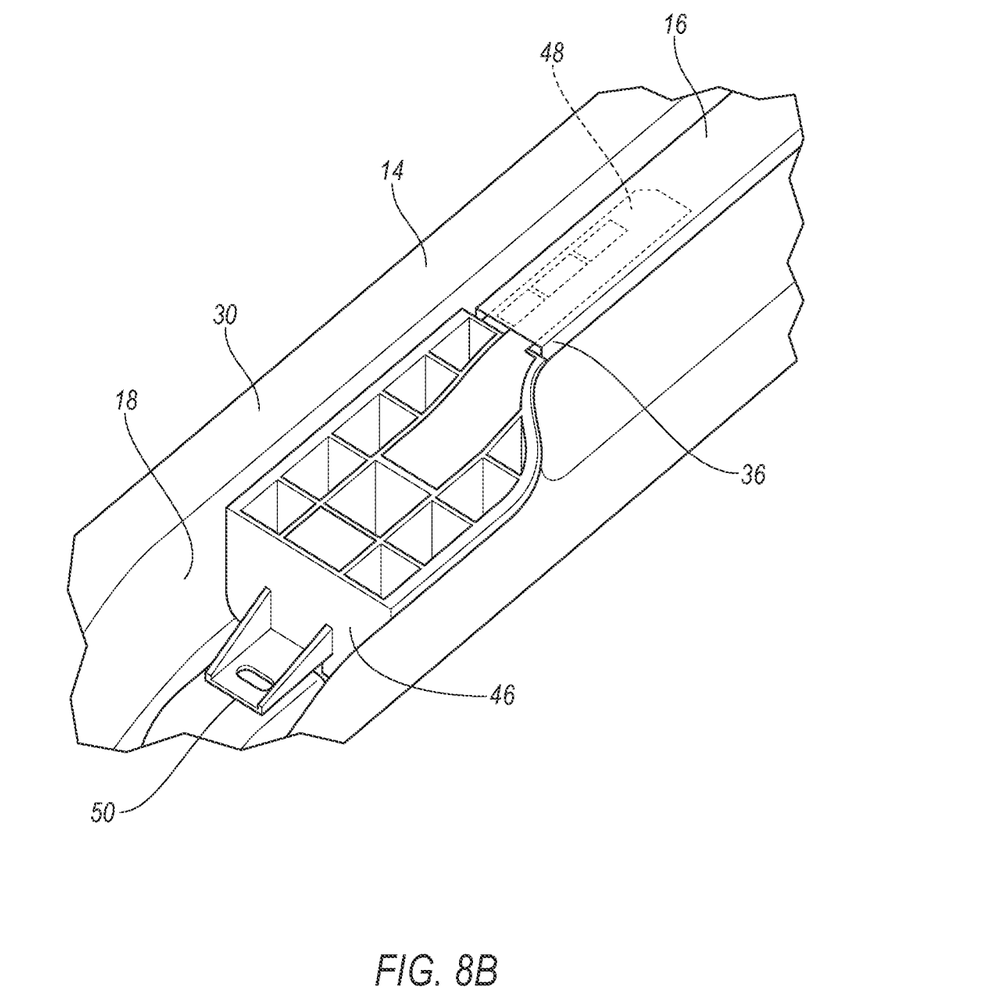
FIG. 8B is an enlarged detail view of the composite reinforcement member according to the teachings of the present disclosure.

In yet another example as shown in FIG. 6, the composite reinforcement member 16 of the hybrid structural assembly 10'' absorbs energy from the rocker panel 28 during a side or oblique impact. In yet another example, as shown in FIGS. 7-8B, the composite reinforcement member 16 of the hybrid structural assembly 10''' absorbs energy from the body cross-member 30 during a side impact.

The composite reinforcement member 16 further includes a first longitudinal end 36 and a second longitudinal end 38. The first and second longitudinal ends 36, 38 are disposed between the first end 18 of the vehicle structural member 14 and the second end 20 of the vehicle structural member 14. That is, the composite reinforcement member 16 has a length L that is shorter than a length of the vehicle structural member 14, and the composite reinforcement member 16 is completely disposed within edges of the vehicle structural member 14. For example, for the vehicle pillar 24' shown in FIG. 4, when the vehicle structural member 14 includes the inner member 32 and the outer member 34, and the composite reinforcement member 16 is disposed between the inner member 32 and the outer member 34. When disposed between the inner and outer members 32, 34, the composite reinforcement member 16 absorbs energy from the outer member 34 and transfers less energy to the inner member 32 than the outer member 34 would transfer without the composite reinforcement member 16. Thus, the composite reinforcement member 16 reduces energy absorption and movement of the inner member 32 toward a passenger cabin of the vehicle 12.

The composite reinforcement member 16 is formed by a continuous method. In this context, a "continuous method" is a method of manufacturing in which material is continuously formed into a shape that forms an object. The object is then cut to length to form an individual part, or composite reinforcement member 16 as illustrated and described herein. Using a continuous method to form the composite reinforcement member 16 improves consistency of energy absorption and deformation characteristics throughout the composite reinforcement member 16 compared to a manufacturing method in which pieces are separately formed and later joined. Upon formation by the continuous method, the composite reinforcement member 16 can be cut to a predetermined length L. For example, the predetermined length L is a length extending from the first end 18 of the vehicle structural member 14 to the second end 20 of the vehicle structural member 14. By forming the composite reinforcement member 16 with the continuous method and cutting to a predetermined length L, the vehicle hybrid assembly 10 includes composite reinforcement members 16 at lengths specified for each vehicle structural member 14 with a more uniform energy absorption characteristic than a reinforcement member formed of separate pieces that are later joined.

In an example, the continuous method is pultrusion, i.e., a method by which fibers 42 or layers of fibers embedded in a matrix are pulled and incorporated with a resin 43 to form an object. In this form, the composite reinforcement member 16 includes a plurality of fibers 42 impregnated with the resin 43 to form a matrix. The fibers 42 extend continuously from a first longitudinal end 36 of the composite reinforcement member 16 to a second longitudinal end 38 of the composite reinforcement member 16. In one form, the fibers 42 are continuous and unidirectional, i.e., extending substantially in a common direction. The common direction is, for example, a longitudinal direction between the longitudinal ends 36, 38 of the composite reinforcement member. At least one of the fibers 42 extends between the first end 18 of the vehicle structural member 14 and the second end 20 of the vehicle structural member 14. The resin 43 is generally a polymer (thermoset or thermoplastic), and the fibers 42 may be, by way of example, glass, carbon, Kevlar®, or boron, among others. In another example, the fibers 42 may be discontinuous. In yet another example, the fibers 42 are disposed only in specific layers while other layers of the object are only neat resin 43. The design of the layers is a suitable combination of materials and orientations for specific energy absorption characteristics of the composite reinforcement member 16 and/or for corrosion resistance.

The fibers 42 are configured to absorb energy from a vehicle impact. By extending unidirectionally along the vehicle structural member 14, the fibers 42 of the composite reinforcement member 16 absorb and distribute energy/loads along the length of the composite reinforcement member 16. That is, energy from impacts that are transverse to the direction of the continuous fibers 42 is distributed along an entire length of each layer, reducing elastic and plastic deformation of the fibers 42 and overall deformation of the composite reinforcement member 16. Thus, by pultruding the fibers 42 into the composite reinforcement member 16, the hybrid structural assembly 10 distribute energy absorbed during vehicle impacts throughout the composite reinforcement member 16 and the vehicle structural member 14.

Figure 3A:
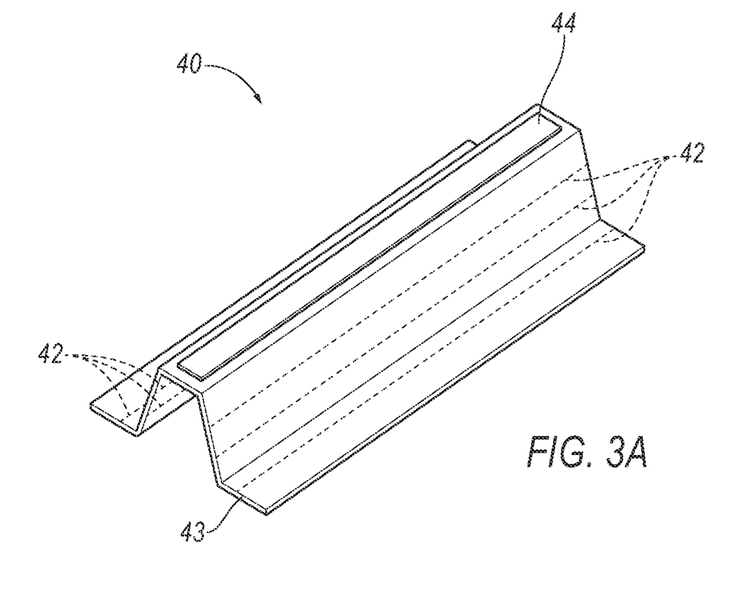
FIG. 3A is a perspective view of one form of a cross-section of a composite reinforcement member according to the teachings of the present disclosure.
Figure 3B:
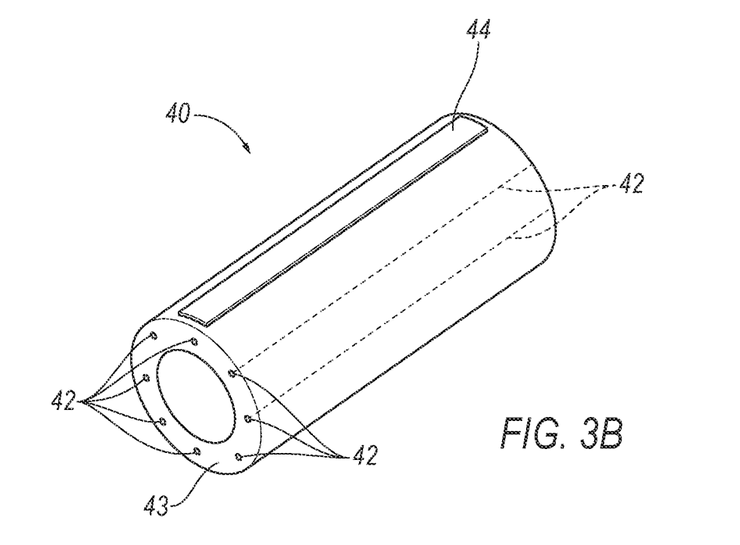
FIG. 3B is another perspective view of a cross-section of a composite reinforcement member according to the teachings of the present disclosure.

Referring to FIGS. 3A, 3B, and 4, in another form of the present disclosure, the continuous method includes applying a layer of adhesive material 44. The adhesive layer 44 adheres the fibers 42 of the composite reinforcement member 16 to the vehicle structural member 14. That is, the adhesive layer 44 is an outermost layer of the composite reinforcement member 16, and the composite reinforcement member 16 is attached to the vehicle structural member 14 by the adhesive layer 44. For example, the adhesive layer 44 adheres the fibers 42 of the composite reinforcement member 16 to one of the inner member 32 or the outer member 34 of the vehicle pillar 24'. By using the adhesive layer 44, the composite reinforcement member 16 is attached to the vehicle structural member 14 without additional fasteners.

The adhesive layer 44 is applied by, e.g., co-extrusion with the pultruded composite reinforcement member 16, adhering after the fibers 42 and the resin 43 solidify, etc.

Referring to FIGS. 1-2 and 5-8B, the composite reinforcement member 16 is alternately attached to the vehicle structural member 14 with a mechanical fastener(s), e.g., a screw (such as a floor drill screw), a bolt, or a fitting 46. In one form, one or more holes (not shown) is drilled in the composite reinforcement member 16, and the mechanical fastener secure the composite reinforcement member 16 to the vehicle structural member 14 through the holes.

Referring to FIGS. 3A-3B, the composite reinforcement member 16 has a uniform cross-section from the first longitudinal end 36 to the second longitudinal end 38. In other words, a cross-section of the composite reinforcement member 16 is substantially the same between the first longitudinal end 36 to the second longitudinal end 38. The uniform cross-section has similar energy absorption characteristics throughout the composite reinforcement member 16, improving energy absorption of the hybrid structural assembly 10. More specifically, the composite reinforcement member 16 absorbs energy from a vehicle impact in a substantially similar manner when impacted at substantially any point along the composite reinforcement member 16. In an example, the cross-section of the composite reinforcement member 16 defines an "open" shape 40, i.e., a shape having ends that do not connect to each other. For example, the cross-section can have a U-shape, as shown in FIG. 3A, a V-shape, a W-shape, or any other suitable open shape 40. Alternatively, the cross-section of the composite reinforcement member 16 defines a "closed" shape 40', i.e., a shape that is enclosed without any breaks or gaps. For example, the cross-section of the composite reinforcement member 16 can have a circular cross-section, as shown in FIG. 3B, a polygonal cross-section (not shown in the Figures), or any other suitable closed shape 40'. The shape 40, 40' of the cross-section is selected based on specified energy absorption characteristics.

As shown in FIGS. 1-2, and 4-8B, the hybrid structural assembly 10 includes a fitting 46 connecting the first longitudinal end 36 of the composite reinforcement member 16 to an adjacent vehicle structural member 14. The fitting 46 includes a base 48 and a tab 50, best shown in FIG. 8B. The base 48 is fixed to the composite reinforcement member 16 and the tab 50 is attached to the vehicle structural member 14. The base 48 is fixed to the composite reinforcement member 16 with, e.g., a mechanical fastener, and the tab 50 is fixed to a suitable attachment location on the vehicle structural member 14. The attachment location generally a hole, a slot, or a cavity, and is shaped to receive the tab 50. For example, the tab 50 includes a sloped surface, and the attachment location include a mating sloped surface and a slot to receive the tab 50. In one form, the tab 50 is fixed to the attachment location via a friction fit. Alternatively or additionally, the tab 50 is fixed to the attachment location via a mechanical fastener (using the slot as shown on the tab) and/or an adhesive.

As shown in the example of FIGS. 1-2, 4-8A, the hybrid structural assembly 10 includes a second fitting 52 attaching the second longitudinal end 38 of the composite reinforcement member 16 to the adjacent vehicle structural member 14. The second fitting 52 include a respective base 54 and a respective tab 56. The fittings 46, 52 are attached to a same vehicle structural member 14 to which the composite reinforcement member 16 is attached. For example, the hybrid structural assembly 10' includes the fitting 46 attached to the roof rail 26, which is the same vehicle structural member 14 to which the composite reinforcement member 16 is attached. Alternatively, the fittings 46, 52 are attached to a different vehicle structural member 14 than the vehicle structural member 14 to which the composite reinforcement member 16 is attached. For example, the adhesive layer 44 of the composite reinforcement member 16 is adhered to a vehicle pillar 24, the fitting 46 is fixed to a roof rail 26, such as shown in FIG. 1, and the second fitting 52 is fixed a rocker panel 28. Alternatively, the fittings 46, 52 are fixed to any suitable vehicle structural member 14.

Figure 9:
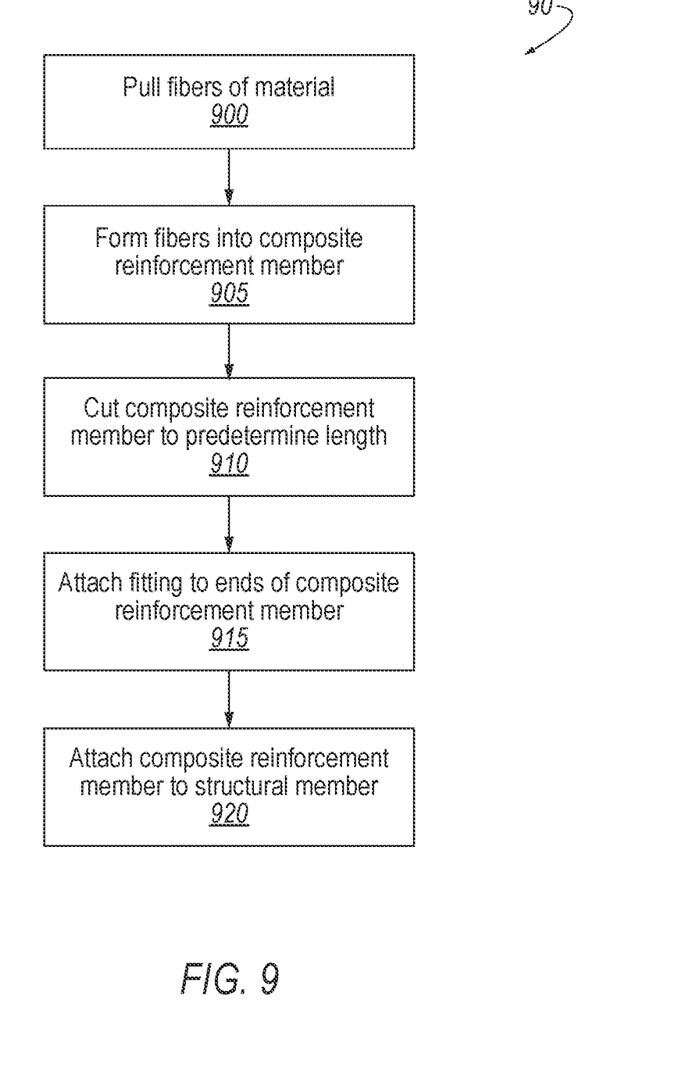
FIG. 9 is a block diagram of an example process for assembling a hybrid structural assembly according to the teachings of the present disclosure.

Referring to FIG. 9, an example process for forming a hybrid structural assembly 10 is illustrated and generally indicated by reference numeral 90. The process 90 begins in a block 900, in which fibers 42 of material are pulled from a plurality of spools. The fibers 42 of material include, e.g., carbon fiber, polymer, glass, and/or metal, among others. A resin is applied and binds the fibers of material.

Next, in a block 905, the fibers 42 and the resin are formed in layers into a composite reinforcement member 16. As described above, the layers are placed to form a uniform cross-section along a length of the composite reinforcement member 16. For example, the cross-section is an open shape 40, as shown in FIG. 3A, or a closed shape 40', as shown in FIG. 3B.

Next, in a block 910, the composite reinforcement member 16 is cut to a predetermined length L. The layers, formed into a solid shape, are cut to a length L based on a vehicle structural member 14 to which the composite reinforcement member 16 is to be attached. That is, the composite reinforcement member 16 is sized to specific vehicle structural members 14 of vehicles 12.

Next, in a block 915, one or more fittings 46, 52 are attached to respective ends 36, 38 of the composite reinforcement member 16. As described above, the fittings 46, 52 include a base 48, 54 that is fixed to the longitudinal ends 36, 38 of the composite reinforcement member 16, e.g., by a friction fit, and a tab 50, 56 that is configured to be attached to an end 18, 20 of the vehicle structural member 14. Alternatively, this step is omitted, e.g., when the composite reinforcement member 16 includes the adhesive layer 44 and does not include the fittings 46, 52.

Next, in a block 920, the composite reinforcement member 16 is attached to the vehicle structural member 14. As described above, the fitting 46, 52 includes a tab 50, 56 that is fixed to an attachment point of the vehicle structural member 14, e.g., by a friction fit. Alternatively or additionally, an adhesive layer 44 of the composite reinforcement member 16 is adhered to the vehicle structural member 14.

Advantageously, the composite reinforcement member 16 provides custom energy absorption characteristics for metal structural reinforcement members 14 during a side or oblique impact test, while addressing weight constraints for overall manufacturing of the vehicle 12. That is, the composite reinforcement member 16 provides similar impact performance than a metal reinforcement while reducing overall weight of the vehicle 12 because the composite reinforcement member 16 is constructed with lower density materials than a conventional reinforcement. Further, the composite reinforcement member 16 reduces overall design complexity of the vehicle 12 by replacing a metal reinforcement that typically requires advanced machining with a continuously formed member that requires little to no further post-processing. Thus, the composite reinforcement member 16 addresses constraints for vehicle weight and performance, which is particularly useful in a hybrid-electric or fully electric vehicle 12.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A hybrid structural assembly comprising:
a vehicle structural member extending from a first end to a second end;
a composite reinforcement member attached to and disposed within the vehicle structural member between the first and second ends of the vehicle structural member, the composite reinforcement member being formed by a continuous method and cut to a predetermined length extending from the first end to the second end; and
a fitting disposed within the vehicle structural member and fixed to the composite reinforcement member, the fitting connecting a first longitudinal end of the composite reinforcement member to one of the vehicle structural member or an adjacent vehicle structural member,
wherein the vehicle structural member is one of a vehicle pillar, a rocker panel, or a body cross-member.

2. The hybrid structural assembly of claim 1, wherein the composite reinforcement member has a uniform cross-section from a first longitudinal end to a second longitudinal end.

3. The hybrid structural assembly of claim 2, wherein the cross section of the composite reinforcement member defines a closed shape.

4. The hybrid structural assembly of claim 2, wherein the cross-section of the composite reinforcement member defines an open shape.

5. The hybrid structural assembly of claim 1, wherein the composite reinforcement member includes a plurality of fibers.

6. The hybrid structural assembly of claim 5, wherein the vehicle structural member extends continuously between the first end and the second end, and the at least one of the plurality of fibers extends along the vehicle structural member between the first end and the second end.

7. The hybrid structural assembly of claim 5, wherein the plurality of fibers extend continuously from a first longitudinal end of the composite reinforcement member to a second longitudinal end of the composite reinforcement member.

8. The hybrid structural assembly of claim 5, wherein the plurality of fibers are unidirectional.

9. The hybrid structural assembly of claim 1, wherein a first longitudinal end of the composite reinforcement member and a second longitudinal end of the composite reinforcement member are disposed between the first end of the vehicle structural member and the second end of the vehicle structural member.

10. The hybrid structural assembly of claim 1, wherein the continuous method is pultrusion.

11. The hybrid structural assembly of claim 10, wherein the continuous method includes applying an adhesive layer that is an outermost layer of the composite reinforcement member.

12. The hybrid structural assembly of claim 1, further comprising a second fitting disposed within the vehicle structural member and fixed to the composite reinforcement member, the second fitting connecting a second longitudinal end of the composite reinforcement member to one of the vehicle structural member or an adjacent vehicle structural member.

13. The hybrid structural assembly of claim 1, wherein the vehicle structural member includes an inner member and an outer member outboard of the inner member, and the composite reinforcement member is disposed between the inner member and the outer member.

14. A vehicle body comprising:
   a vehicle structural member including a first end and a second end;
   a composite reinforcement member attached to and disposed within the vehicle structural member, the composite reinforcement member including a first longitudinal end, a second longitudinal end, and a plurality of pultruded fibers extending continuously from the first longitudinal end to the second longitudinal end; and
   a fitting disposed within the vehicle structural member and fixed to the composite reinforcement member, the fitting connecting the first longitudinal end of the composite reinforcement member to an adjacent vehicle structural member,
   wherein the composite reinforcement member has a uniform cross-section from the first longitudinal end to the second longitudinal end,
   and wherein the vehicle structural member is one of a vehicle pillar, a rocker panel, or a body cross-member.

15. The vehicle body of claim 14, wherein the first longitudinal end of the composite reinforcement member and the second longitudinal end of the composite reinforcement member are disposed between the first end of the vehicle structural member and the second end of the vehicle structural member.

16. A method of producing a hybrid structural assembly, the method comprising:
   forming, by a continuous method, a composite reinforcement member;
   cutting the composite reinforcement member to a predetermined length extending from a first end of a vehicle structural member to a second end of a vehicle structural member; and
   attaching the composite reinforcement member to the vehicle structural member between the first and second ends of the vehicle structural member by at least a fitting disposed within the vehicle structural member,
   wherein the vehicle structural member is one of a vehicle pillar, a rocker panel, or a body cross-member.

17. The method of claim 16, further comprising forming the composite reinforcement member with a uniform cross-section from a first longitudinal end to a second longitudinal end.

* * * * *